United States Patent Office 3,438,774
Patented Apr. 15, 1969

3,438,774
LIGHT-SENSITIVE COMPOSITIONS CONTAINING METHINE DYES HAVING A BENZOTHIAZOLE NUCLEUS SUBSTITUTED WITH A SULFONAMIDO GROUP
Henri Depoorter and Marcel Jan Libeer, Mortsel-Antwerp, Belgium, assignors to Gevaert-Agfa N.V., Mortsel, Belgium, a Belgian company
No Drawing. Filed Aug. 23, 1965, Ser. No. 481,976
Claims priority, application Great Britain, Aug. 25, 1964, 34,691/64
Int. Cl. G03c 1/08
U.S. Cl. 96—1.7
9 Claims

ABSTRACT OF THE DISCLOSURE

Light-sensitive materials useful in photography and electrophotography are disclosed. These materials contain methine dyes which serve as optical sensitizing agents. The dyes are compounds containing at least one benzothiazole nucleus having in the 4- or 7-position a sulphonamido group, or an N-acetyl-substituted sulphonamido group, which sulphonamido groups are linked to the benzene-ring of the benzothiazole nucleus either by the sulphur atom or by the nitrogen atom.

---

This invention relates to new methine dyes, to methods for preparing them and to their use as optical sensitising agents in light-sensitive materials. More particularly this invention relates to the optical sensitisation of light-sensitive elements by means of methine dyes containing at least one benzothiazole nucleus having in the 4- or 7-position a sulphonamido group or a N-acetyl-substituted sulphonamido group which sulphonamido groups are linked to the benzene ring of the benzothiazole nucleus either by the sulphur atom or by the nitrogen atom.

Surprisingly, these methine dyes are valuable optical sensitisers of photographic silver halide emulsions and of electrophotographic materials containing photoconductive zinc oxide. The high sensitising power of these dyes is unexpected, since it has been found before that the introduction of electronegative substituents in the benzene nucleus of a benzothiazole methine dye involves a considerable decrease of the sensitising action. Contrary to the corresponding 5- or 6-sulphonamido-substituted benzothiazole methine dyes which follow the rule characteristic of the electronegative substitution of the benzothiazole nucleus, the sensitising action of the dyes according to the present invention is so high that they are very suited for extending the spectral sensitivity of photosensitive materials.

The new methine dyes are particularly useful for extending the spectral sensitivity of gelatino silver halide emulsions since in addition to interesting sensitising properties they offer the advantage of causing practically no residual stain in wet-processed photographic materials. The presence in said materials of residual stain is particularly troublesome in photographic materials used in photomechanical processes for graphic reproduction purposes. For example in the use of photographic negatives of the lithographic type which are to be corrected by a colour mask image, a neutral tint of the negative is required.

So, it is an object of the present invention to provide a new class of trimethine dyes. A further object is to provide methods for preparing these new dyes. Still another object is to provide photographic silver halide emulsions sensitised with these new dyes. Other objects will become apparent from the description and examples.

According to the present invention we more particularly provide a methine dye salt or a merocyanine dye containing at least one heterocyclic residue according to one of the following general structures:

I.
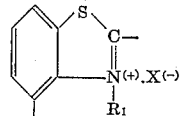

II.
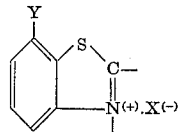

III.
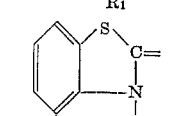

IV.
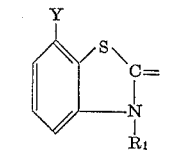

wherein:

$R_1$ represents an alkyl group, such as methyl, ethyl, n-propyl, n-butyl, n-amyl, isopropyl, isobutyl, a substituted alkyl radical such as β-hydroxyethyl, β-acetoxyethyl, sulphoethyl, sulphopropyl, sulphobutyl, propyl sulphate or butyl sulphate, an unsaturated aliphatic radical such as allyl, an aralkyl radical such as benzyl, a substituted benzyl radical such as carboxybenzyl, an aryl radical such as phenyl, a substituted aryl radical such as carboxyphenyl, a cycloalkyl radical such as cyclohexyl; further $R_1$ may also represent a substituted alkyl group such as the group —A—CO—O—B—SO$_2$—OH wherein A and B each represents a hydrocarbon group as described in the United Kingdom patent specification 886,271 filed June 20, 1957 by Gevaert Photo-Production N.V., or the group —A—W—NH—V—B wherein A represents a methylene radical, an ethylene radical, a propylene radical or a butylene radical, B represents an alkyl group, an amino group, a substituted amino group and also a hydrogen atom in the case V is a single bond, and W and V each represents a —CO— radical, a —SO$_2$— radical or a single bond, but at least one of them is a —SO$_2$— radical as described in the United Kingdom patent specification 904,332 filed July 5, 1957 by Gevaert Photo-Producten N.V.
Y represents a —SO$_2$NH$_2$ radical, a —SO$_2$NH—COCH$_3$ radical, a —NH—SO$_2$CH$_3$ radical, a

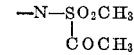

radical, or a

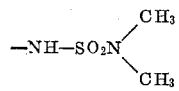

radical, and
X— an acid radical.

The general structures I and II appear in the methine dye salts whereas the general structures III and IV appear in the non-ionic merocyanine dyes.
It has to be remarked, however, that as alternatives of the general structures I and II containing a —NH—SO$_2$— group betaine structures may occur, which are due to the acidic nature conferred to the —NH— group by the adjacent —SO₂— group. The acidic nature of the —NH— group enables the methine dye salts to get isolated under each of the two structural forms.

Examples of such betaine structures are given further on.

The new methine dye salts and merocyamine dyes according to the present invention are prepared preferably from reactive quaternary salts corresponding to one of the following general formulae:

V.  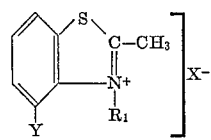

VI. 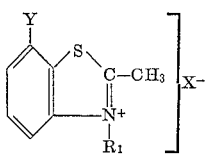

wherein:

$R_1$, Y and $X^-$ have the same significance as described above.

The following preparations illustrate the way of obtaining said quaternary salts.

PREPARATION 1
2-methyl-4-amino-benzothiazole

This product is prepared as described by E. D. Sych and A. I. Tolmatsjev in Ukr. Khim. Zhurn., 27 (1961).

PREPARATION 2
2-methyl-4-chlorosulphonylbenzothiazole 7.5 g. of 2-methyl-4-amino-benzothiazole are suspended in 30 ccs. of concentrated hydrochloric acid and diazotised by addition of 3.5 g. of sodium nitrite dissolved in 7 ccs. of water. The obtained diazonium salt solution is added to a solution of 1.82 g. of copper (II) chloride in 18 ccs. of water and 44 ccs. of acetic acid saturated with sulphur dioxide. The reaction mixture is stirred for 10 min. and poured into 200 ccs. of icewater. The precipitated sulphonyl chloride is sucked off, washed with cold water, dried and finally recrystallized from benzine having a boiling point: 70–90. Yield: 6.6 g. Melting point: 121° C.

PREPARATION 3
2-methyl-4-sulphamyl-benzothiazole

A solution of 4 g. of 2-methyl-4-chlorosulphonyl-benzothiazole in 20 ccs. of absolute ethanol is poured into 20 ccs. of 16 N ammonium hydroxide. The formed precipitate is sucked off and recrystallised from ethanol. Yield: 2.5 g. Melting point: 242° C.

PREPARATION 4
2-methyl-4-acetylsulphamyl-benzothiazole 2 g. of 2-methyl-4-sulphamyl-benzothiazole are dissolved in 40 ccs. of acetic anhydride and the solution is refluxed for 4 hours. After cooling, the precipitate is sucked off. Yield: 1.7 g. Melting point: 272° C.

PREPARATION 5
2-methyl-7-nitro-benzothiazole

This product is prepared according to E. D. Sych, Ukr. Khim. Zhurn., 14, 107 (1949).

PREPARATION 6
2-methyl-7-amino-benzothiazole 10.6 g. of 2-methyl-7-nitro-benzothiazole are hydrogenated in the presence of Raney nickel at 50° C. under a hydrogen pressure of 60 p.s.i.

After 3 mole equivalents of hydrogen have been absorbed the catalyst is filtered and the resulting filtrate is evaporated under reduced pressure and nitrogen atmosphere. A nearly quantitative yield of 2-methyl-7-amino-benzothiazole (melting point: 102° C.) is obtained. After recrystallisation from petroleum ether the melting point is found to be 104° C.

PREPARATION 7
2-methyl-7-chlorosulphonyl-benzothiazole 35 g. of 2-methyl-6-amino-benzothiazole are suspended in 100 ccs. of concentrated hydrochloric acid and diazotised by addition of 16 g. of sodium nitrite dissolved in 25 ccs. of water. The resulting solution is added dropwise to a solution obtained by mixing 200 ccs. of acetic acid saturated with sulphur dioxide with 8.5 g. of copper (II) chloride dissolved in 85 ccs. of water. After the reaction mixture has been stirred for 10 min., it is poured out in icewater. The precipitate is then sucked off, washed with icewater and recrystallised from hexane. Yield: 34 g. Melting point: 104–106° C.

PREPARATION 8
2-methyl-7-sulphamyl-benzothiazole 5 g. of 2-methyl-7-chlorosulphonyl-benzothiazole are dissolved in 15 ccs. of absolute ethanol and poured into 25 ccs. of concentrated ammonium hydroxide. The formed precipitate is sucked off and recrystallised from ethanol. Yield: 3 g. Melting point: 228° C.

PREPARATION 9
2-methyl-7-acetylsulphamyl-benzothiazole 3 g. of 2-methyl-7-sulphamyl-benzothiazole are dissolved in 15 ccs. of acetic anhydride and refluxed for 1 h. The obtained product is recrystallised from acetic acid. Yield: 1 g. Melting point: 246° C.

PREPARATION 10
2-methyl-4-methylsulphonamido-benzothiazole

To 8.2 g. of 2-methyl-4-amino-benzothiazole dissolved in 25 ccs. of pyridine heated till near to its boiling point are added dropwise 5.7 g. of methylsulphonylchloride. After cooling, the reaction mixture is poured into 200 ccs. of water. The precipitate formed is sucked off, washed with water and recrystallised from a mixture of benzene/hexane (50:50). Yield: 6.4 g. Melting point: 154° C.

PREPARATION 11

2-methyl-7-methylsulphonamido - benzothiazole is prepared analogously to the isomer substituted in the 4-position with the methylsulphonamido group. Melting point: 180° C.

PREPARATION 12

2-methyl-7-dimethylaminosulphonamido - benzothiazole is prepared analogously to 2-methyl-7-methylsulphonamido-benzothiazole, but dimethylsulphamylchloride is used in lieu of methylsulphonylchloride. Melting point: 148° C.

The following preparations illustrate the preparation of quaternary salts falling within the scope of the above-cited general formulae.

PREPARATION 13
2,3-dimethyl-4-sulphamyl-benzothiazolium p-tolusulphonate

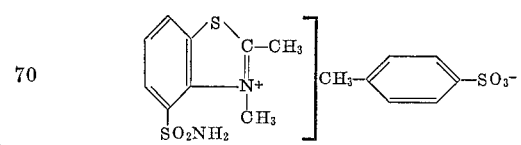

2.95 g. of 2-methyl-4-sulphamyl-benzothiazole and 2.25 g. of methyl-p-tolusulphonate are heated together for 16 h. at 170° C. The cooled reaction mixture is washed with ether. The washed sticky product is used as such in the preparation of the dyes. 2,3-dimethyl-4-acetylsulphamyl-benzothiazolium p - tolusulphonate and 2,3-dimethyl-4-methylsulphonamido - benzothiazolium methyl sulphate are prepared analogously.

PREPARATION 14

2-methyl-3-ethyl-7-sulphamyl-benzothiazolium p-tolusulphonate

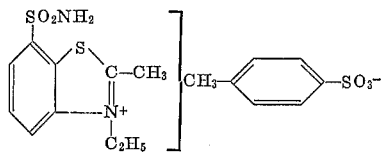

4 g. of the corresponding base and 4 g. of ethyl p-tolusulphonate are heated together for 2 hours at 150° C. The cooled reaction mixture is washed with acetone and ether. Yield: 6 g. Melting point: 225° C.

In the same way are prepared:

2-methyl-3-ethyl-7-acetylsulphamyl-benzothiazolium p-tolusulphonate.

2,3-dimethyl-7-sulphamyl-benzothiazolium p-tolusulphonate, and 2,3-dimethyl-7-acetylsulphamyl-benzothiazolium p-tolusulphonate.

PREPARATION 15

2-methyl-3-(N-methylsulphonyl)-carbamylmethyl-7-sulphamyl-benzothiazolium bromide 3.42 g. of the corresponding base and 3.3 g. of N-(bromoacetyl)-methane sulphonamide are heated for 24 h. at 120° C. The cooled reaction mixture is washed with ether. Yield: 6.4 g. Melting point: 265° C.

PREPARATION 16

2,3-dimethyl-7-methylsulphonamido-benzothiazolium methyl sulphate

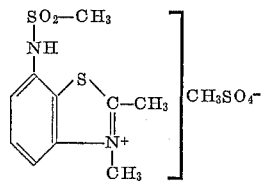

4.82 g. of the corresponding base, 3 ccs. of dimethyl sulphate and 10 ccs. of toluene are heated for 16 h. at 110° C. The precipitate is then sucked off and washed with acetone and ether. Melting point: 160° C.

2,3-dimethyl - 7 - dimethylaminosulphonamido-benzothiazolium methyl sulphate is prepared in an analogous way.

New asymmetrical and symmetrical trimethine dye salts according to the present invention corresponding to one of the following general Formulae VII and VIII:

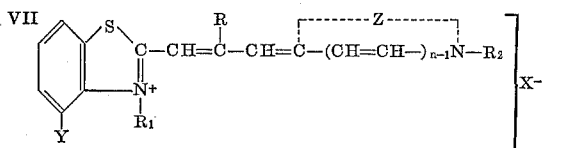

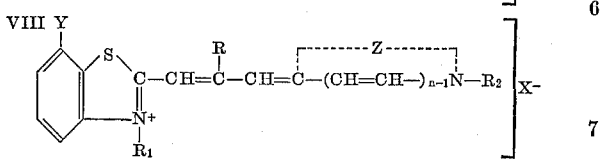

wherein:

$R_1$, Y and $X^-$ have the same significance as described above,

R represents a hydrogen atom, a lower alkyl radical such as methyl or ethyl, a benzyl radical or phenyl radical, $R_2$ has the same significance as $R_1$, n represents a positive integer 1 or 2, and Z represents the atoms necessary to complete a heterocyclic nitrogen nucleus containing 5 to 6 atoms in the heterocyclic ring such as those of the thiazole series (e.g. thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole), those of the benzothiazole series (e.g. benzothiazole, 4-chlorobenzothiazole, 5-chlorobenzothiazole, 6-chlorobenzothiazole, 7-chlorobenzothiazole, 4-methylbenzothiazole, 5 - methylbenzothiazole, 6 - methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, 4,5,6,7-tetrahydrobenzothiazole, 5,6-dimethoxybenzothiazole, 5,6-dioxymethylenebenzothiazole, 5-hydroxybenzothiazole, 6-hydroxybenzothiazole, 5,6-dimethylbenzothiazole), those of the naphthothiazole series (e.g. naphtho[2,1-d]thiazole, naphtho[1,2-d]thiazole, 5-methoxynaphtho[1,2 - d]thiazole, 5-ethoxynaphtho[1,2-d]thiazole, 8-methoxynaphtho[2,1-d]thiazole, 7-methoxynaphtho[2,1-d]thiazole), those of the thionaphtheno [7,6-d]thiazole series (e.g. 7-methoxythionaphtheno [7,6-d]thiazole), those of the oxazole series (e.g. 4-methyloxazole, 5-methyloxazole, 4-phenyloxazole, 4,5-diphenyloxazole, 4-ethyloxazole, 4,5-dimethyloxazole, 5-phenyloxazole), those of the benzoxazole series (e.g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 6-methoxybenzoxazole, 5-hydroxybenzoxazole, 6-hydroxybenzoxazole), those of the naphthoxazole series (e.g. naphtho[2,1-d]oxazole, naphtho[1,2-d]oxazole), those of the selenazole series (e.g. 4-methylselenazole, 4-phenylselenazole), those of the benzoselenazole series (e.g. benzoselenazole, 5-chlorobenzoselenazole, 5-methoxybenzoselenazole, 5-hydroxybenzoselenazole, 4,5,6,7-tetrahydrobenzoselenazole), those of the naphthoselenazole series (e.g. naphtho[2,1-d]selenazole, naphtho[1,2-d]selenazole), those of the thiazoline series (e.g. thiazoline, 4-methylthiazoline, 4-hydroxymethyl-4-methylthiazoline, 4,4-bis-hydroxymethylthiazoline, 4-acetoxymethyl-4-methylthiazoline, 4,4-bis-acetoxymethylthiazoline), those of the oxazoline series (e.g. oxazoline, 4-hydroxymethyl-4-methyloxazoline, 4,4-bis-hydroxymethyloxazoline, 4-acetoxymethyl-4-methyloxazoline, 4,4-bis-acetoxymethyl oxazoline), those of the selenazoline series (e.g. selenazoline) those of the 2-quinoline series (e.g. the quinoline, 3-methylquinoline, 5-methylquinoline, 7-methylquinoline, 8-methylquinoline, 6-chloroquinoline, 8-chloroquinoline, 6 - methoxyquinoline, 6 - ethoxyquinoline, 6 - hydroxyquinoline, 8 - hydroquinoline, etc.), those of the 4-quinoline series (e.g., quinoline, 6-methoxyquinoline, 7-methylquinoline, 8-methylquinoline), those of the 1-isoquinoline series (e.g. isoquinoline, 3,4-dihydroisoquinoline), those of the 3-isoquinoline series (e.g. isoquinoline), those of the 3,3-dialkylindolenine series (e.g. 3,3-dimethylindolenine, 3,3,5-trimethylindolenine, 3,3,7-trimethylindolenine), those of the pyridine series (e.g. pyridine, 5-methylpyridine), those of the benzimidazole series (e.g. 1-ethylbenzimidazole, 1-phenylbenzimidazole, 1 - ethyl-5,6 - dichlorobenzimidazole, 1-hydroxyethyl-5,6-dichlorobenzimidazole, 1-ethyl - 5 - chlorobenzimidazole, 1 - ethyl - 5,6 - dibromobenzimidazole, 1-ethyl-5-chloro-6-aminobenzimidazole, 1-ethyl - 5 - chloro-6-bromobenzimidazole, 1-ethyl-5-phenylbenzimidazole, 1-ethyl - 5 - fluorobenzimidazole, 1-ethyl - 5,6 - difluorobenzimidazole, 1-ethyl-5-cyanobenzimidazole, 1-(β-acetoxyethyl) - 5 - cyanobenzimidazole, 1-ethyl - 5 - chloro - 6 - cyanobenzimidazole, 1- ethyl - 5 - fluoro - 6 - cyanobenzimidazole, 1-ethyl-5-acetylbenzimidazole, 1 - ethyl - 5 - chloro - 6 - fluorobenzimidazole, 1ethyl-5-carboxymenzimidazole, 1-ethyl-7-carboxybenzimidazole, 1-ethyl - 5 - carbethoxybenzimidazole, 1-ethyl - 7 - carbethoxybenzimidazole, 1-ethyl-5-sulphamylbenzimidazole, 1-ethyl-5-N-ethylsulphamylbenzimidazole), and a nucleus according to the general Formulae I and II, can be prepared by condensing one of the benzothiazolium salts according to the general Formulae V and VI with a cycloammonium quaternary salt represented by the following general Formula IX:

IX.
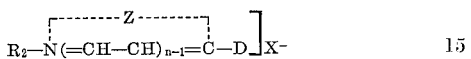

wherein:

$R_2$, Z, n and $X^-$ have the same significance as described above, and

D represents a β-arylamino-vinyl group, a β-alkylmercapto-vinyl group, a β-arylmercapto-vinyl group, a β-acetanilido-vinyl group or a β-p-tolusulphanilido-vinyl group, which vinyl groups may carry a substituent, e.g. methyl, ethyl, benzyl or phenyl.

Condensations of this type are advantageously carried out in the presence of a basic condensing agent, for example a trialkylamine such as triethylamine, a dialkylaniline, a heterocyclic amine such as pyridine or N-alkylpiperidine, or the like. The condensations of this type can be carried out by allowing the intermediates to react in the presence of an inert diluent such as methanol, ethanol, diethyl ether, acetone, 1,4-dioxane, if needed, whilst heating.

New asymmetrical methine dye salts according to the present invention can also be prepared by condensing benzothiazolium salts according to the general Formulae V and VI with a heterocyclic base of the following Formula X:

X.
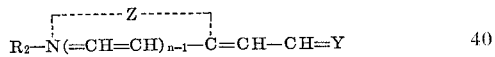

wherein:

$R_2$, Z and n have the same significance as described above, and

Y represents a reactive atom such as an oxygen atom, a sulphur atom, a selenium atom or a reactive group such as an aryl-N= group e.g. a phenylimino group.

The condensation of this type is advantageously carried out in the presence of an acid anhydride such as acetic anhydride.

New symmetrical trimethine dye salts can also be prepared by condensing a benzothiazolium salt according to one of the general Formulae V or VI with an orthocarboxylic acid alkyl ester, such as ethyl ortho-formate, advantageously in pyridine or acetic anhydride.

New merocyanine dyes according to the present invention corresponding to one of the following general Formulae XI and XII:

XI.
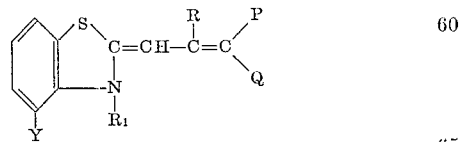

XII.
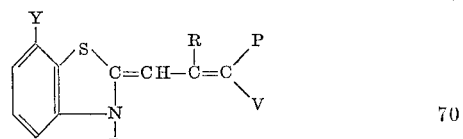

wherein:

R, $R_1$ and Y have the same significance as described above, and

P and Q each represents an electro-negative group e.g. a —CN, —$COOR_3$ group, wherein $R_3$ represents a hydrogen atom or an alkyl radical e.g. an alkyl radical of the formula $C_wH_{2w+1}$ wherein w represents an integer from 1 to 4, or a —CO—$R_4$ radical, wherein $R_4$ represents an alkyl radical such as methyl or ethyl or an aryl radical such as phenyl, or P and Q represent in the radical

the necessary atoms to complete a heretocyclic nucleus with electronegative character e.g. a cyclic ketomethylene nucleus such as those of the pyrazolone series (e.g. 3-methyl-1-phenyl-5-pyrazolone, 1-phenyl-5-pyrazolone, 1-(2-benzothiazolyl)-3-methyl-5-pyrazolone), those of the isoxazolone series (e.g. 3-phenyl-5-isoxazolone, or 3-methyl-5-isoxazolone), those of the oxindole series (e.g. 1-alkyl-2,3-dihydro-2-oxindoles), those of the 2, 4,6-triketohexahydropyrimidine series (e.g. barbituric acid or 2-thiobarbituric acid as well as their derivatives such as these substituted in the 1-position by an alkyl group such as methyl group, an ethyl group, a 1-n-propyl group and a 1-n-heptyl group, or those substituted in the 1- or 3-position by a β-methoxy ethyl radical or those substituted in the 1- and 3-position by an aryl radical such as a phenyl radical, or those substituted in the 1- and 3-position by a substituted phenyl radical such as a p-chlorophenyl radical, or a p-ethoxycarbonyl phenyl radical, or those substituted only in the 1-position by a phenyl-, a p-chlorophenyl- or p-ethoxy carbonylphenyl radical, further the mixed alkylaryl substituted derivatives such as 1-ethyl-3-phenyl- or 1-n-heptyl-3-phenyl derivatives), those of the rhodanine series (i.e. 2-thio-2,4-thiazolidinedione series), such as rhodanine, and aliphatic substituted rhodanines (e.g. 3-ethyl-rhodanine or 3-allyl-rhodanine), those of the 2-imidazo[1,2-a]pyridone series, those of the 5,7-dioxo-6,7-dihydro - 5 - thiazolo[3,2-a]pyrimidine series (e.g. 5,7 - dioxo-3-phenyl-6,7-dihydro-5-thiazolo[3,2-a] pyrimidine), those of the 2-thio-2,4-oxazolidinedione series (e.g. 3-ethyl-2-thio-2,4-oxazolidinedione), those of the thianaphthenone series (e.g. 3-thianaphthenone), those of the 2-thio-2,5-thiazolidinedione series (e.g. 3-ethyl-2-thio-2,5-thiazolidinedione), those of the 2,4-thiazolidinedione series (e.g. 2,4-thiazolidinedione, 3-ethyl-2,4-thiazolidinedione, 3-phenyl-2,4-thiazolidinedione, 3-alpha-naphthyl-2,4-thiazolidinedione), those of the thiazolidone series (e.g. 4-thiazolidone, 3-ethyl-4-thiazolidone, 3-phenyl-4-thiazolidone, 3 - alpha-naphthyl-4-thiazolidone), those of the 4-thiazolone series (e.g. 2-ethylmercapto-4-thiazolone), 2 - alkylphenylamino - 4 - thiazolones, 2-diphenylamino-4-thiazolone), those of the 2-imino-2,4-oxazolinone (i.e. pseudohydantoin) series, those of the 2,4-imidazolinedione (hydantoin) series (e.g. 2,4-imidazolinedione, 3-ethyl-2,4-imidazolinedione, 3-phenyl-2,4-imidazolinedione, 3-alpha-naphthyl-2,4-imidazolinedione, 1,3-diethyl-2,4-imidazolinedione, 1-ethyl-3-phenyl-2,4-imidazolinedione, 1 - ethyl-3-alpha-naphthyl-2,4-imidazolinedione, 1,3 - diphenyl-2,4-imidazolinedione), those of the 2-thio-2,4-imidazolinedione (i.e. 2-thio-hydantoin) series (e.g. 2-thio-2,4-imidazolinedione, 3 - ethyl-2-thio-2,4-imidazolinedione, 3-phenyl-2-thio-2,4-imidazolinedione, 3-alpha-naphthyl-2-thio-2,4-imidazolinedione, 1,3-diethyl-2-thio-2,4-imidazolinedione, 1 - ethyl-3-phenyl-2-thio-2,4-imidazolinedione, 1 - ethyl-3-alpha-naphthyl-2-thio-2,4-imidazolinedione, 1,3-diphenyl-2-thio-2,4-imidazolinedione), those of the 5-imidazolone series (e.g. 2-n-propyl-mercapto-5-imidazolone), can be prepared by condensing one of the benzothiazolium salts according to the general Formulae V and VI with a compound represented by the following formula:

XIII. 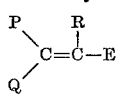

wherein:

R, P and Q have the same significance as set forth above, and

E represents an alkylmercapto or arylmercapto group, an alkoxy group, an arylamino group, an acetanilido group or a p-toluenesulphonanilido group.

The following examples illustrate the preparation of methine dyes according to the present invention.

EXAMPLE 1

The sensitising dye of the formula:

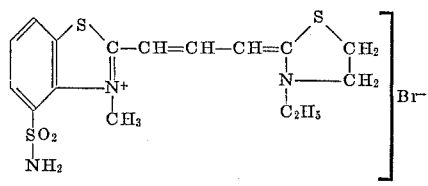

is prepared as follows:

4.15 g. of 2,3-dimethyl-4-sulphamyl-benzothiozolium p-tolusulphonate and 3.55 g. of 2-(β-acetanilidovinyl-3-ethylthiazolinium-bromide are dissolved in 25 ccs. of ethanol and refluxed for 5 min. with 2.8 ccs. of triethylamine.

The dyestuff obtained is purified by recrystallising from phenol and digesting with ethanol. Melting point: >260° C. Absorption maximum: 508 nm. Log ε: 5.15.

EXAMPLE 2

The sensitising dye of the formula:

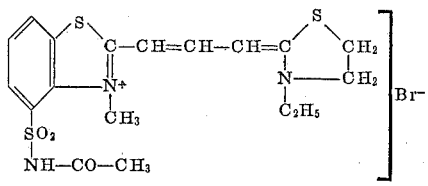

is prepared in the same way as the drystuff of Example 1 but starting from 2,3-dimethyl-4-acetylsulphamyl-benzothiazolium p-tolusulphonate. Melting point: >260° C. Absorption maximum: 508 nm. Log ε: 5.20.

EXAMPLE 3

The sensitising dye of the formula:

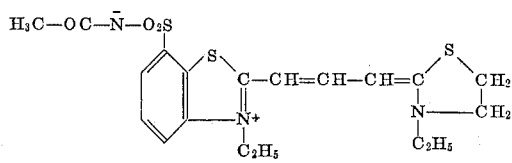

is prepared in the same way as the dyestuff of Example 1, but starting from 2-methyl-3-ethyl-7-acetylsulphamyl-benzothiazolium p-tolusulphonate Melting point: >270° C. Absorption maximum: 504 nm. Log ε: 5.10.

EXAMPLE 4

The sensitising dye of the formula:

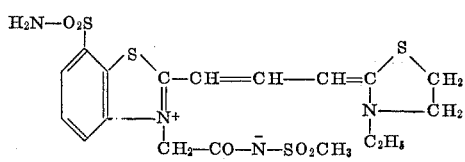

is prepared by adding whilst cooling 4 ccs. of triethylamine to a mixture of 6.2 g. of 2-methyl-3-(N-methyl-sulphonyl)-carbamylmethyl-7-sulphamyl-benzothiazolium bromide and 5 g. of 2-(β-acetanilidovinyl)-3-ethyl-thiazolium bromide dissolved in a mixture of 75 ccs. of ethyleneglycolmonomethyl ether and water. Next 100 css. of ethanol are added and the precipitated dyestuff is sucked off and purified by recrystallisation from a mixture of phenol and ethanol. Melting point: 220° C. Absorption max.: 502 nm.

EXAMPLE 5

The sensitising dye of the formula:

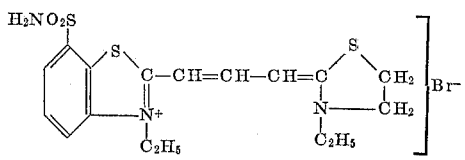

is prepared analogously to the dye of Example 4. Absorption max: 501 nm. Log ε: 5.07.

EXAMPLE 6

The sensitising dye of the formula:

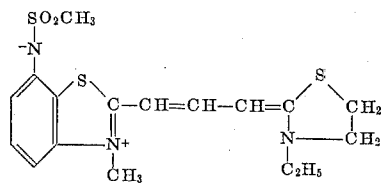

is prepared as follows:

3.7 g. of 2,3 - dimethyl-7-methylsulphonamido-benzothiazolium methyl sulphate, 3.55 g. of 2-(2-acetanilidovinyl)-3-ethyl thiazolinium bromide, 25 ccs. of ethanol and 2.8 ccs. of triethylamine are shaken at room temperature for 30 min. The dye is filtered and recrystallised once from pyridine and twice from a mixture of ethanol and water (1:1). Melting point: 276–278° C. Absorption max.: 506 nm. Log ε: 4.96.

EXAMPLE 7

The sensitising dye of the formula:

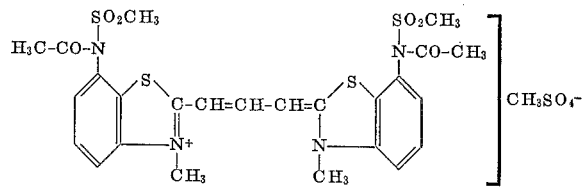

is prepared as follows:

7.6 g. of 2,3 - dimethyl-7-methylsulphonamido-benzothiazolium methyl sulphate, 7.6 g. of ethyl orthoformate and 50 ccs. of acetic anhydride are refluxed for 20 min. The dye is collected and recrystallized twice from a mixture of phenol and ethanol and once from a mixture of diacetone, ethanol and water. Melting point: 278–281° C. Adsorption max.: 556 nm. Log ε: 4.82.

EXAMPLE 8

The sensitising dye of the formula:

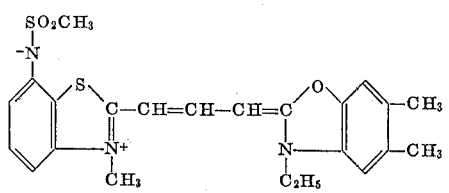

is prepared analogously to the dye of Example 6. Melting point: 281–282° C. Absorption max.: 530 nm. Log ε: 5.16.

EXAMPLE 9

The sensitising dye of the formula:

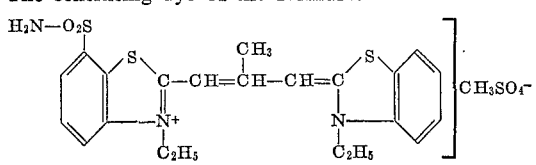

is prepared as follows:

To a mixture of 4.3 g. of 2-methyl-3-ethyl-7-sulphamyl-benzothiazolium p-tolusulphonate and 3.6 g. of 2 - ($\beta$ - methyl-$\beta$-methylmercaptovinyl)3-ethyl-benzothiazolium sulphate dissolved in 60 ccs. of pyridine is added 1.4 ccs. of triethylamine. The reaction mixture is boiled for 30 min. After cooling, the dyestuff is sucked off and purified by recrystallisation from phenol. Melting point: 260° C. Adsorption max.: 547 nm. Log $\epsilon$: 5.11.

EXAMPLE 10

The sensitising dye of the following formula is prepared analogously to the dye of Example 9.

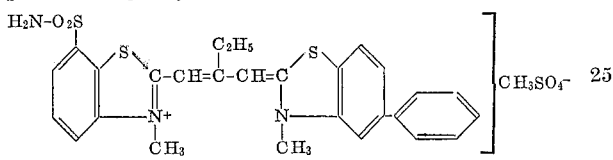

Melting point: >260° C. Absorption max.: 551 nm. Log $\epsilon$: 4.98.

EXAMPLE 11

The sensitising dye of the following formula is prepared analogously to the dye of Example 9.

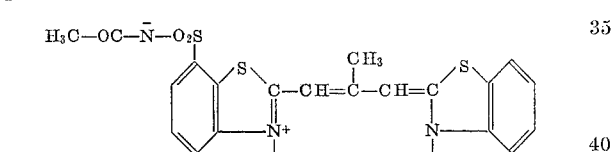

Melting point: >270° C. Absorption max.: 545 nm. log $\epsilon$: 4.94.

EXAMPLE 12

The sensitising dye of the following formula is prepared analogously to the dye of Example 9.

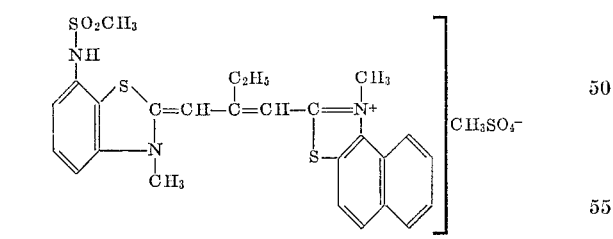

Melting point: 249–250° C. Absorption max.: 568 nm. Log $\epsilon$: 4.80.

EXAMPLE 13

The sensitising dye of the following formula is prepared analogously to the dye of Example 9.

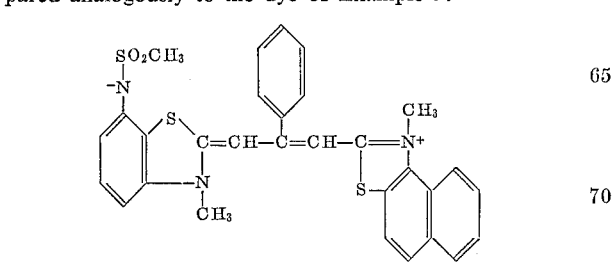

Melting point: 265–267° C. Absorption max.: 582 nm. Log $\epsilon$: 5.14.

EXAMPLE 14

The sensitising dye of the following formula is prepared analogously to the dye of Example 9.

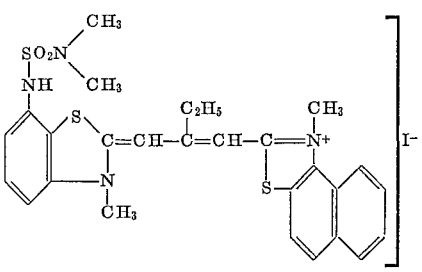

Melting point: 192° C. Absorption max.: 569 nm. Log $\epsilon$: 5.06.

EXAMPLE 15

The sensitising dye of the following formula is prepared analogously to the dye of Example 9.

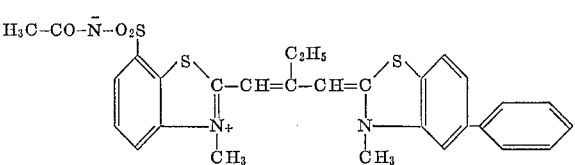

Melting point: >270° C. Absorption max.: 551 nm. Log $\epsilon$: 4.80.

EXAMPLE 16

The sensitising dye of the formula:

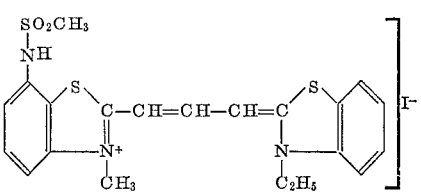

is prepared as follows:

3.68 g. of 2,3-dimethyl-7-methylsulphonamido-benzothiazolium methyl sulphate, 4.5 g. of 2-($\beta$-acetanilidovinyl)-3-ethyl-benzothiazolium iodide, 2.8 ccs. of triethylamine and 50 ccs, of ethanol are refluxed for 30 min. After cooling, the dye is collected, washed with ethanol and recrystallised twice from diacetone alcohol and water (2:1). Melting point: 207–209° C. Absorption max.: 559 nm. Log $\epsilon$: 5.12.

EXAMPLE 17

The sensitising dye of the formula:

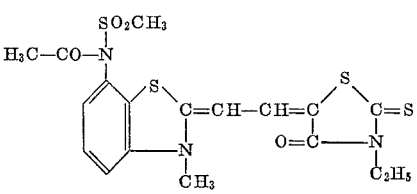

is prepared as follows:

4.7 g. of 2-($\beta$-anilinovinyl)-2-methyl-7-methylsulphonamido-benzothiazolium methyl sulphate, 1.6 g. of 3-ethyl-thiazolidine -2-thione-4-one, 2.4 ccs. of triethylamine and 25 ccs. of acetic anhydride are refluxed for 15 min. The dye is collected and recrystallised three times from diacetone alcohol. Melting point: 265° C. Absorption max.: 516 nm. Log $\epsilon$: 4.53.

EXAMPLE 18

The sensitising dye of the following formula is prepared analogously to the dye of Example 17:

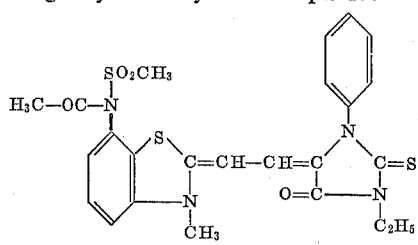

Melting point: 275–278° C. Absorption max.: 506 nm. Log ε: 4.39.

EXAMPLE 19

The sensitising dye of the following formula is prepared analogously to the dye of Example 17:

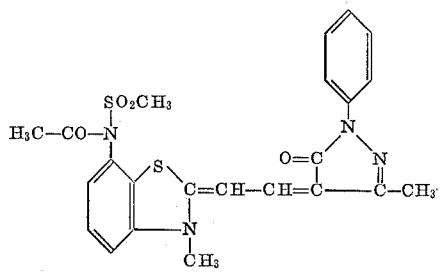

Melting point: 265° C. Absorption max.: 4.92 nm. Log ε: 4.77.

The new methine dyes are especially useful for extending the spectral sensitivity of the customarily employed gelatino silver chloride, gelatino silver chlorobromide, gelatino silver bromide, gelatino silver bromoiodide and gelatino silver chloro-bromo-iodide emulsions. Photographic emulsions containing water-permeable colloids other than gelatin, such as agar-agar, zein, collodion, water-soluble cellulose derivatives, poly(vinyl alcohol) or other hydrophilic synthetic or natural resins or polymeric compounds, can, however, also be sensitised with the methine dyes according to the present invention.

In order to prepare photographic emulsions sensitised according to this invention by one or more of the new methine dyes, the methine dyes are incorporated in the photographic emulsion by one of the methods customarily employed in the art. In practice, it is convenient to add the dyes to the emulsion in the form of a solution in an appropriate solvent. The new methine dyes can be added at any stage of the preparation of the emulsion and should be uniformly distributed throughout the emulsion. The concentration of the dyes in the emulsion may vary widely, for example from 1 to 200 mg. per kg. of flowable emulsion and will vary according to the effect desired. The suitable and most economical concentration for any particular emulsion will be apparent to those skilled in the art, upon making the ordinary tests and observations customarily used in the art of emulsion making.

The new methine dyes can be incorporated into photographic emulsions the general sensitivity of which has been increased by physical and chemical ripening. As suitable chemical sensitisers may be mentioned the well-known sulphur sensitisers such as allyl isothiocyanate, allylthiourea, sodium thiosulphate, potassium selenocyanide, the natural sensitisers originating in the gelatin, the reducing sensitisers such as imino-aminomethane sulphinic acid and the derivatives thereof, further cadmium salts, and the salts of noble metals such as gold, platinum and palladium.

In preparing the photographic emulsions according to the invention, the usual and suitable addenda such as antifogging agents, stabilisers, antibronzing agents, hardeners, wetting agents, plasticisers, development accelerators, colour couplers, fluorescent brighteners and ultra-violet screening compounds can moreover be incorporated in the emulsion in the manner customarily employed in the art. In this respect it may be as well be mentioned that the sensitivity of the silver halide emulsions sensitised according to the process of the present invention is not adversely affected but rather enhanced by the presence therein of certain fluorescent compounds. Another advantage of the process for sensitising silver halide emulsions according to the present invention is the compatibility of the new methine dyes with anionic wetting agents and with colour couplers, which is of great importance in the application of the new methine dyes for sensitising the silver halide emulsions of a light-sensitive element for colour photography.

The photographic emulsions optically sensitised according to the invention may further be supersensitised and/or hypersensitised by one of the methods known to those skilled in the art.

Emulsions sensitised with the new methine dyes can be coated in the usual manner on a suitable support such as glass, cellulose derivative film, resin film or paper.

Although the methine dyes according to the present invention are especially useful for extending the spectral sensitivity of silver halide emulsions, the methine dyes according to this invention also possess optical sensitising properties for photoconductive compounds e.g. photoconductive zinc oxide.

The methine dyes according to this invention are incorporated preferably in a photoconductive layer such as a photoconductive layer containing photoconductive zinc oxide, in an amount of 0.05 to 0.1 mole percent in respect of the photoconductive substance.

The new methine dyes according to this invention can be incorporated in the photoconductive layer by one of the methods customarily employed in the art.

The following table is to illustrate the optical sensitisation results obtained with methine dyes according to the present invention.

Optimum amounts of the sensitising methine dyes are incorporated into different portions of photographic gelatino silver halide emulsions prepared with varying contents and kinds of halides. The different portions of emulsions are then coated on a support and exposed in the usual manner. The measurements are carried out with a spectrograph and a sensitometer. For the determination of the "total" speed the exposure of the sensitised light-sensitive material is executed without filter by means of a daylight-type lamp or an incandescent bulb. The speed values are calculated in respect of the speed values of identical though unsensitised emulsions to which has been given the speed value 100.

| Dye of example | Mg. of dye used per kg. of emulsion | Emulsion type | Sensitisation, maximum (nm.) | Speed at sensitisation, maximum | Total speed |
|---|---|---|---|---|---|
| 1 | 30 | AgCl | 540 | 250 | 500 |
| 2 | 20 | AgCl | 540 | 500 | 550 |
| 3 | 30 | AgCl | 535 | 250 | 800 |
| 4 | 20 | AgCl | 535 | 300 | 600 |
| 5 | 30 | AgCl | 535 | 300 | 850 |
| 6 | 30 | AgCl | 540 | 500 | 625 |
| 7 | 30 | AgCl | 600 | 600 | 1,275 |
| 8 | 20 | AgCl | 565 | 400 | 800 |
| 9 | 30 | AgCl | 580 | 600 | 1,400 |
| 10 | 30 | AgCl | 580 | 500 | 800 |
| 11 | 50 | AgCl | 580 | 700 | 1,000 |
| 12 | 30 | AgCl | 595 | 700 | 1,200 |
| 13 | 30 | AgCl/Br | (660) 610 | 350 | 650 |
| 14 | 30 | AgCl | (650) 600 | 800 | 1,600 |
| 15 | 30 | AgCl | 580 | 400 | 600 |
| 16 | 30 | AgCl | 605 | 1,000 | 1,600 |
| 17 | 30 | AgCl | 590 | 500 | 600 |
| 18 | 30 | AgCl | 570 | 550 | 800 |

We claim:
1. A spectrally sensitized light-sensitive material containing a light-sensitive silver halide and a methine dye selected from the group consisting of compounds according to the following general Formulae I, II, III and IV:

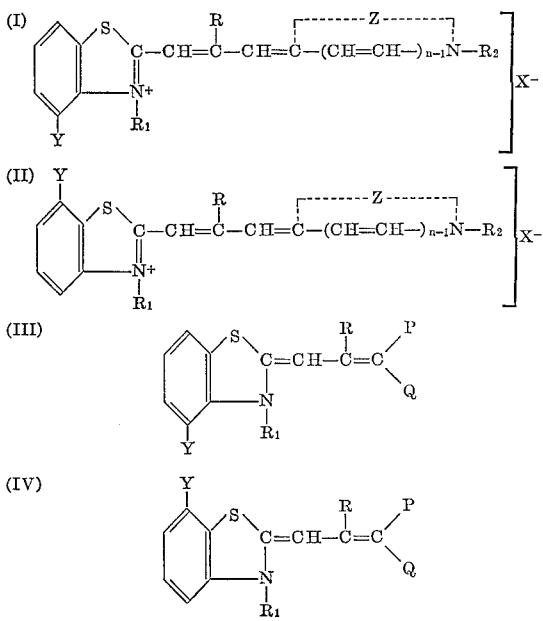

wherein:

Y represents a —SO$_2$NH$_2$ radical, a

—SO$_2$—NH—COCH$_3$ radical, a —NH—SO$_2$CH$_3$ radical, a

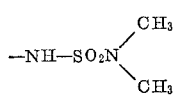

radical or a

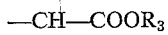

radical,

X⁻ represents an acid radical,

R$_1$ represents an alkyl radical,

R is selected from the group consisting of a hydrogen atom, a lower alkyl radical, a benzyl radical, and a phenyl radical, R$_2$ has the same significance as R$_1$, $n$ is selected from the group consisting of the positive integers 1 and 2, Z represents the atoms necessary to complete a heterocyclic nitrogen nucleus containing 5 to 6 atoms in the heterocyclic ring, and P and Q each represents an electro-negative radical selected from the group consisting of a

—CH—COOR$_3$ group, wherein R$_3$ is selected from the group consisting of a hydrogen atom, a lower alkyl radical, a —CO—R$_4$ radical, wherein R$_4$ is selected from the group consisting of a lower alkyl radical and a mononuclear aryl radical, and where P and Q in the radical

represent the necessary atoms to complete a heterocyclic nucleus.

2. A spectrally sensitized light-sensitive material containing photoconductive zinc oxide and a methine dye according to claim 1.

3. A photographic light-sensitive silver halide emulsion layer containing a methine dye salt selected from the group consisting of compounds according to general Formulae I and II of claim 1.

4. A photographic light-sensitive silver halide emulsion layer containing a merocyanine dye selected from the group consisting of compounds according to general Formulae III and IV of claim 1.

5. The light-sensitive material of claim 1 wherein the methine dye is

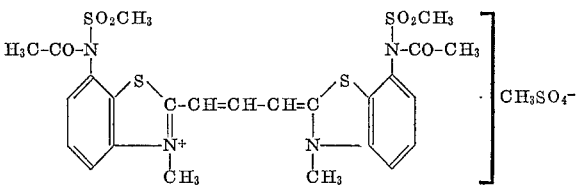

6. The light-sensitive material of claim 1 wherein the methine dye is

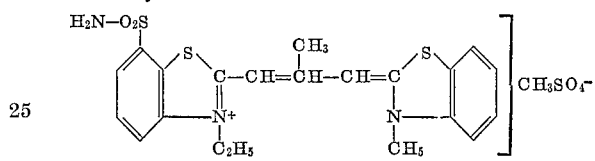

7. The light-sensitive material of claim 1 wherein the methine dye is

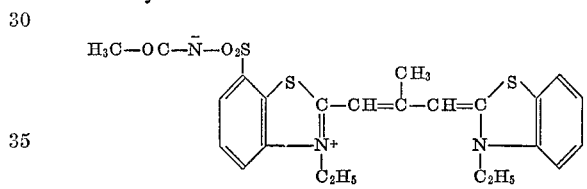

8. The light-sensitive material of claim 1 wherein the methine dye is

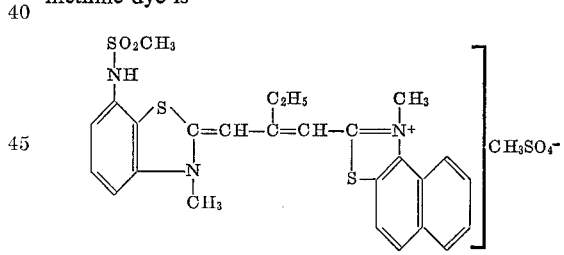

9. The light-sensitive material of claim 1 wherein the methine dye is

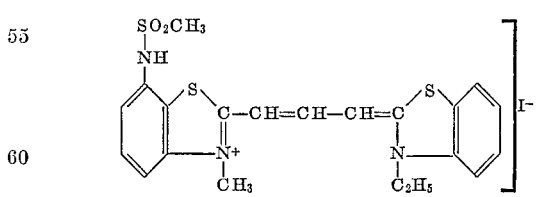

References Cited

FOREIGN PATENTS 986,571 3/1965 Great Britain.

J. TRAVIS BROWN, *Primary Examiner.*

U.S. Cl. X.R.

96—102, 106

UNITED STATES PATENT OFFICE
CERTIFICATE OF CORRECTION

Patent No. 3,438,774                                                      April 15, 1969

Henri Depoorter et al.

It is certified that error appears in the above identified patent and that said Letters Patent are hereby corrected as shown below:

Column 2, line 65, "X.—" should read -- $X^-$ --. Column 7, line 3, "lethyl-5-" should read -- 1-ethyl-5- --; same column 7, Formula IX should appear as shown below:

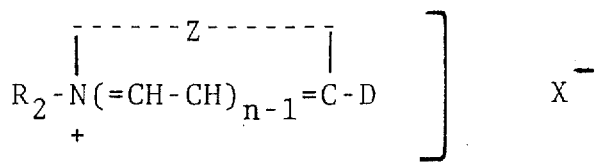

same column 7, lines 65 to 70, Formula XII should appear as shown below:

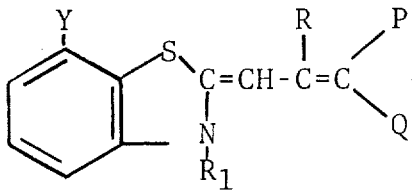

Column 8, line 4, "$C_wH_{2w\div1}$" should read -- $C_wH_{2w+1}$ --. Column 10 line 4, "100 css." should read -- 100 ccs. --; line 60, "Adsorption" should read -- Absorption --. Column 11, line 18, "Adsorption" should read -- Absorption --. Column 12, line 24, "$H_3C$-CO-$\bar{N}$-$O_2S$ . . ." should read -- $H_3C$-OC-$\bar{N}$-$O_2S$ . . . --; same column, line 50, "50 ccs," should read -- 50 ccs. --. Column 16, lines 21 to 27, the formula should appear as shown below:

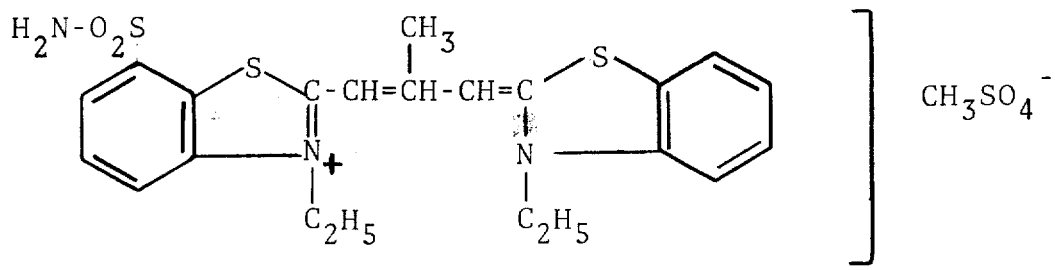

Signed and sealed this 22nd day of December 1970.

(SEAL)
Attest:

EDWARD M. FLETCHER, JR.                              WILLIAM E. SCHUYLER, JR.
Attesting Officer                                              Commissioner of Patents